United States Patent [19]
Prunty

[11] Patent Number: 5,316,808
[45] Date of Patent: May 31, 1994

[54] GUARDED VEHICLE HOOD ORNAMENT

[76] Inventor: Harold Prunty, 1022 Hilltop Rd., Waterloo, Iowa 50701

[21] Appl. No.: 27,279

[22] Filed: Mar. 5, 1993

[51] Int. Cl.$^5$ .............................................. B60R 13/00
[52] U.S. Cl. ..................................... 428/31; 280/727; 40/591
[58] Field of Search ......................... 428/31; 280/727; 40/591

[56] References Cited

U.S. PATENT DOCUMENTS 5,002,810 3/1991 Birdwell et al. .................... 280/727

Primary Examiner—Alexander S. Thomas
Attorney, Agent, or Firm—James C. Nemmers

[57] ABSTRACT

The invention relates to a means of deterring the theft of the medallion of a vehicle hood ornament. By substituting for the wire clip of the conventional hood ornament assembly a protective sleeve in which is contained a cotter pin having its upper portion or head heat treated to harden it, the assembly provides substantial resistance to the medallion being manually pulled out of the mounting base to expose any portion of the cotter pin. If the cotter pin is exposed, the hardened steel head portion and protective sleeve resist cutting by ordinary hand tools.

6 Claims, 1 Drawing Sheet

5,316,808

GUARDED VEHICLE HOOD ORNAMENT

BACKGROUND OF THE INVENTION

This relates to a guarded vehicle ornament that prevents or deters the theft of the hood ornament.

In more recent years, the automobile manufacturers for safety reasons have designed the hood ornaments so that the ornament will give without breaking if it strikes any object. It is known in the art that many of these vehicle hood ornaments are thus retained in place within a mounting assembly by means of a wire clip positioned within a helical spring with the end of the clip bent over the end of the spring. This arrangement allows the hood ornament to be pushed forwardly or backwardly after which it will return to its original position upright position without breaking and without injury to any person that comes into contact with the ornament. Unfortunately, this mounting assembly also allows the ornament to be pulled upwardly from of its mounting base by compressing the helical spring and exposing the head of the wire clip which can then be rather easily cut by wire cutters or other means and the hood ornament removed. Thus, these hood ornaments, especially those for "luxury cars", are favorite items for theft, especially by vandals who use the medallion portion of the ornament to make pendants, bracelets, etc. Due to the ease by which hood ornaments can be taken, and the expense of replacing the entire assembly that includes the medallion, there exists a need to more securely attach the hood ornament to prevent its unauthorized removal while still allowing the ornament to yield for safety reasons if it strikes an object or person.

SUMMARY OF THE INVENTION

The present invention satisfies the need for more secure retention of the vehicle hood ornament while retaining the original spring length and its function. This is accomplished in the preferred embodiment by substituting for the wire clip a steel notched protective sleeve in which is contained a cotter pin having its upper portion or head heat treated to harden it. By use of the protective sleeve and cotter pin with a heat treated head, the assembly provides substantial resistance to the ornament being manually pulled out of the mounting base thus exposing the cotter pin. Additionally, even if the ornament is pulled out of the mounting base to expose any portion of the cotter pin, the hardened steel head portion resists cutting by ordinary cutting tools.

DESCRIPTION OF THE PREFERRED EMBODIMENT

Figure 1:
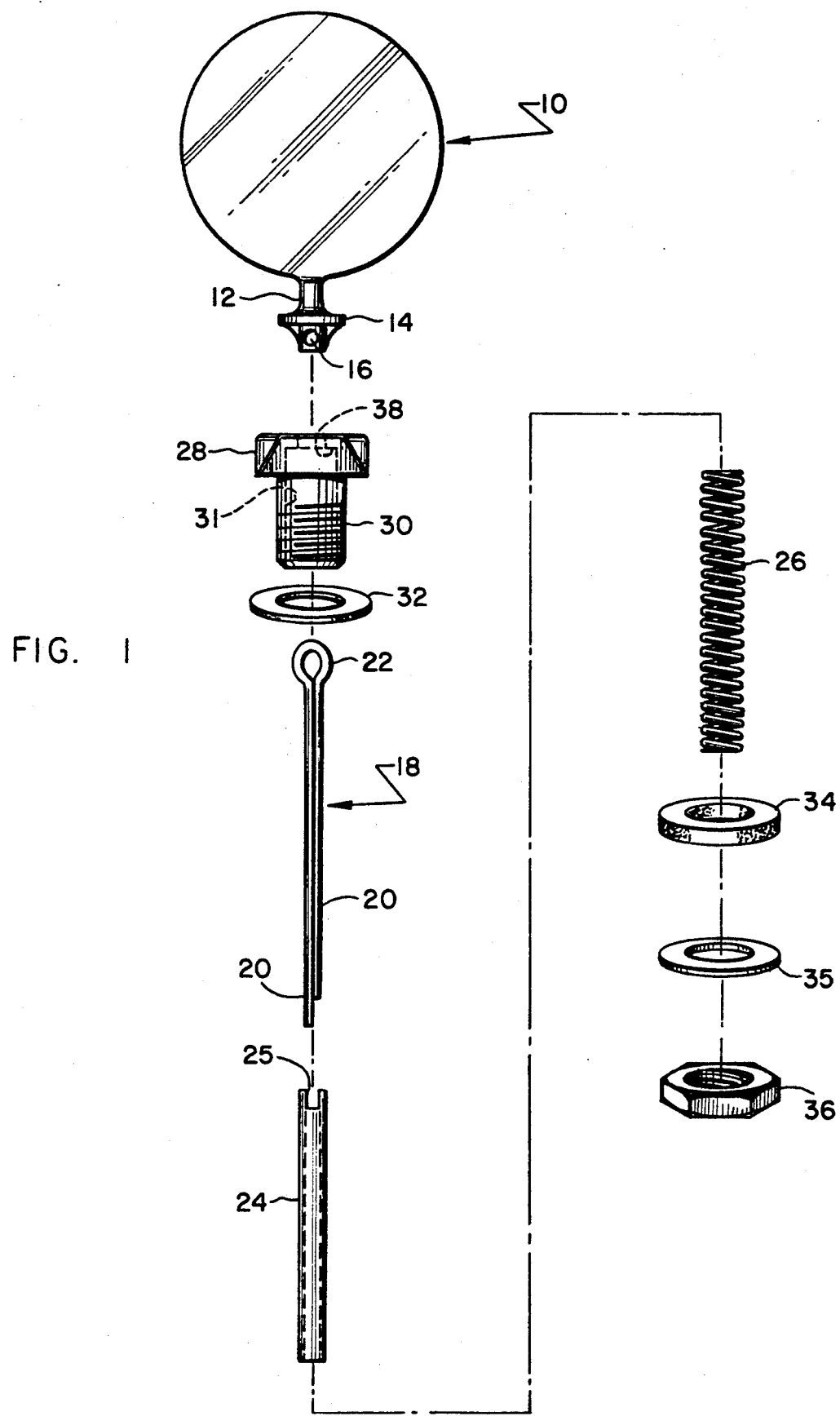
FIG. 1 is an exploded view showing the components of the guarded hood ornament of the invention.

In the preferred embodiment disclosed herein, the guarded hood ornament is constructed of a decorative metallic hood medallion 10 having a tail portion 12 extending downwardly and widening into a bottom portion 14 in which an eye 16 is formed. A cotter pin 18 having a pair of parallel downwardly extending legs 20 one of which is inserted through the eye 16 so that the head 20 of the pin 18 is captured by the bottom portion 14 of the medallion 10. The cotter pin 18 is constructed of steel with the head 20 and the upper parts of the legs 20 being heat treated to harden them so as to resist cutting by wire cutters or other similar hand tools.

The cotter pin 18 is received in a protective sleeve 24 constructed of steel or other suitable material. The sleeve 24 is preferably cylindrical in shape, open at both ends and has a hollow interior to accept the cotter pin 18. At the top of the sleeve 24 there are formed two parallel notches 25 into which the head 22 of the cotter pin 18 is seated so that the head 22 will be covered and thus protected by sleeve 24. The upper section of the sleeve 24 is also heat treated so as to harden it. A helical spring 26 has an interior diameter slightly larger than the exterior diameter of the sleeve 24 so as to receive and surround the sleeve 24. The spring 26 is made of spring steel or other suitable material.

In order to secure the ornament assembly on the hood (not shown) of a vehicle, a mounting base 28 having a downwardly extending shaft 30 receives the tail portion 12 of the medallion 10. The widened bottom portion 14 of the medallion 10 will rest on top of the base 28. The shaft 30 of the mounting base 28 extends through an opening in the hood (not shown) of the vehicle, is cylindrical and exteriorly threaded to receive a gasket 32, rubber washer 34, a steel washer 35 and a nut 36 that secures the ornament assembly in position on the hood. The shaft 30 is shorter than the length of the spring 26 in its normal uncompressed condition. The mounting base 28 has a cylindrical, vertical opening 31 extending through it, which opening 31 is sufficiently large to receive the cotter pin 18, sleeve 24 and spring 26. The opening 31 is narrowed at its upper end to form a shoulder 38 against which the spring 26 engages when assembled, the narrowed upper end being sufficiently wide to allow the cotter pin 18 and sleeve 24 to pass through but not the spring 26. Gasket 32 is positioned between the mounting base 28 and the hood on which base 28 rests, while the washer 34, washer 35 and nut 36 are positioned beneath the hood.

To assemble the ornament, the tail portion 12 of the medallion 10 is inserted into the mounting base 28 which rests on the top of the vehicle's hood with the gasket 32 between the bottom of the base 28 and hood of the vehicle. With the cotter pin 18 inserted through the eye 16 of the tail portion 12 so that the head 22 of the cotter pin 18 is locked to the tail portion 12 and the legs 20 extend through the opening 31 in the shaft 30, the sleeve 24 is placed over the downwardly extending legs 20 of the cotter pin 18 and the helical spring 26 is positioned over the sleeve 24. The spring 26 is then compressed against the shoulder 33 and the ends of the cotter pin 18 are then turned sharply outwardly and upwardly to engage the bottom of the spring 26 and thus capture the sleeve 24 and spring 26. Since the spring 26 will not pass through the mounting base 28, the compressed spring will pull the medallion 10 against the top of the base 28 and hold it in place on the mounting base 28 as it sits positioned upon the hood of the vehicle. The rubber washer 34, steel washer 35 and nut 36 are then slipped over the shaft 30 and the nut 36 threaded onto the shaft and tightened against the washer 35 to secure the ornament assembly to the vehicle hood.

When properly assembled, the medallion 10 cannot be removed without straightening the ends of the cotter pin 18 so that the pin 18 can be disengaged from the spring base 26. The medallion 10 can be pushed forwardly and backwardly against the resistance of the spring 26, but the action of the spring 26 will always return the medallion 10 to its proper position seated on top of the mounting base 28. If sufficiently force is applied to pull the medallion 10 up away from the base 28 so as to expose the tail portion 12 and its connection to the cotter 18, the medallion 10 can be separated from the assembly only by cutting completely through the cotter pin 18 and the sleeve 24. Since this is difficult without the proper tools, such as a hack saw or heavy duty bolt cutter, unauthorized removal of the medallion 10 by vandals is greatly discouraged.

Having thus described the invention in connection with a preferred embodiment thereof, it will be evident to those skilled in the art that various revisions and modifications can be made to the preferred embodiment without departing from the spirit and scope of the invention. It is my intention, however, that all such revisions and modifications as are obvious to those skilled in the art will be included within the scope of the following claims.

What is claimed is as follows:

1. A vehicle hood ornament assembly for mounting the medallion that is a part of the assembly onto the top of the vehicle hood through an opening in the hood so as to deter or prevent theft of the medallion, said assembly comprising:
   a. a medallion with a tail section extending downwardly through the opening in the hood and having an eye in said section;
   b. a mounting base having a top surface and a lower portion with an opening extending through the base and the lower portion to receive the tail section of the ornament with the medallion engaged on the top surface of the base and the lower portion of the base extending through the opening in the hood, said opening in the base being narrower at the top surface to form a shoulder in the opening of the base near the top of the base;
   c. a cotter pin having a head portion and legs terminating in lower ends that are bendable outwardly and upwardly, the head being engageable with the eye in the tail section and when so engaged the cotter pin extends through the opening in the mounting base;
   d. a cylindrical sleeve surrounding the cotter pin and extending into the opening in the mounting base;
   e. a helical spring received in the opening in the mounting base with the upper end of the spring engageable with the shoulder in the opening of the base, the cotter pin and sleeve extending through the spring with the ends of the cotter pin bent upwardly and outwardly beneath the spring so as to engage the spring and bias the medallion against the mounting base, the spring allowing the medallion to be pulled upwardly away from the mounting base so as to expose the tail section of the medallion and its connection to the cotter pin if sufficient force is applied to the medallion; and
   f. fastening means engageable with the lower portion of the mounting base beneath the hood for securing the mounting base to the hood of the vehicle.

2. The hood ornament assembly of claim 1 wherein the cotter pin is made with its head portion and the upper portions of the legs beneath the head portion hardened to resist cutting.

3. The hood ornament assembly of claim 1 wherein the cylindrical sleeve has a notch on each side of its upper end to receive the head portion of the cotter pin in the notches so that the sleeve covers a majority of the head portion.

4. The hood ornament assembly of claim 3 wherein the cylindrical sleeve is hardened to resist cutting.

5. A vehicle hood ornament assembly for deterring or preventing theft of the medallion that is part of the assembly, said assembly comprising:
   a. a medallion with a tail section extending downwardly and having an eye in said section;
   b. a mounting base having a top surface and a lower portion with an opening extending through the base and the lower portion to receive the tail section of the ornament with the medallion engaged on the top surface of the base, said opening being narrower at the top surface to form a shoulder in the opening near the top;
   c. a cotter pin having a head portion and legs terminating in lower ends that are bendable outwardly and upwardly, the head being engageable with the eye in the tail section and when so engaged the cotter pin extends through the opening in the mounting base;
   d. a cylindrical sleeve surrounding the cotter pin and extending into the opening in the mounting base, said sleeve having a notch on each side of its upper end to receive the head portion of the cotter pin in the notches so that the sleeve covers a majority of the head portion;
   e. a helical spring received in the opening in the mounting base with the upper end of the spring engageable with the shoulder in the opening, the cotter pin and sleeve extending through the spring with the ends of the cotter pin bent upwardly and outwardly beneath the spring to bias the medallion against the mounting base; and
   f. fastening means for securing the mounting base to the hood of the vehicle.

6. The hood ornament assembly of claim 5 wherein the cylindrical sleeve is hardened to resist cutting.

* * * * *